Figure 1:
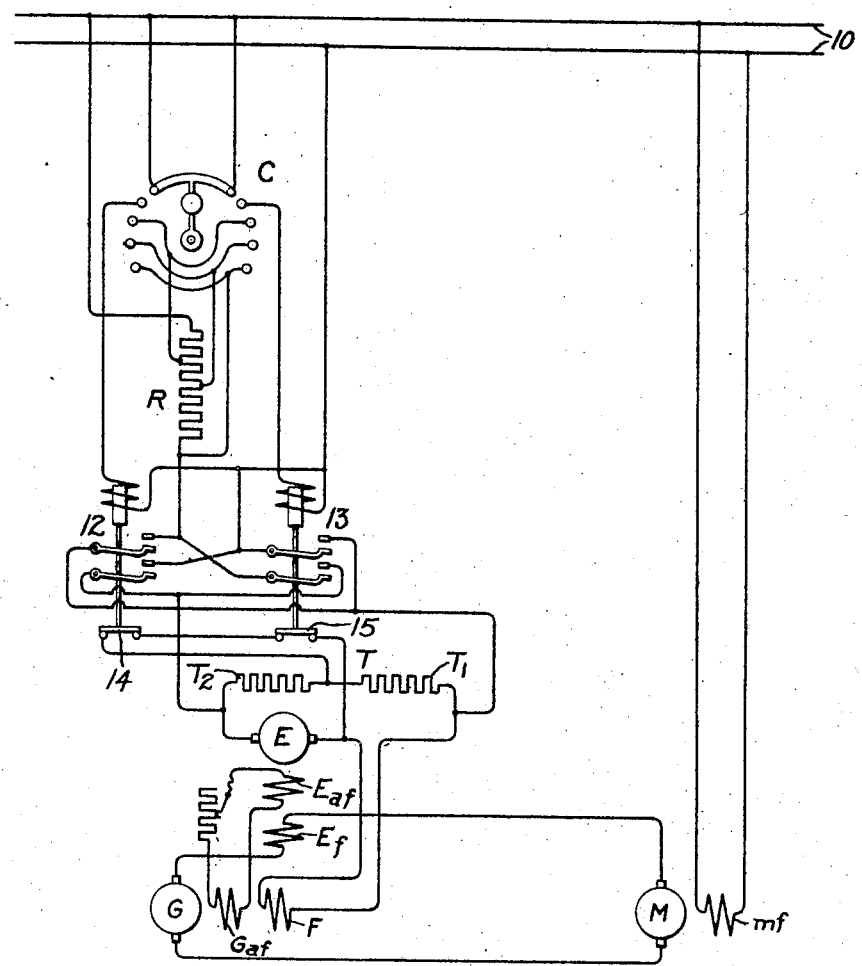

April 9, 1929.    M. A. WHITING    1,708,747

CONTROL OF DYNAMO ELECTRIC MACHINES

Filed Aug. 16, 1927

Inventor:
Max A. Whiting.
by
His Attorney.

Patented Apr. 9, 1929.

1,708,747

UNITED STATES PATENT OFFICE.

MAX A. WHITING, OF SCHENECTADY, NEW YORK, ASSIGNOR TO GENERAL ELECTRIC COMPANY, A CORPORATION OF NEW YORK.

CONTROL OF DYNAMO-ELECTRIC MACHINES.

Application filed August 16, 1927. Serial No. 213,409.

My invention relates to improvements in systems of motor control whereby the rate of acceleration and the rate of retardation of the device operated by the motor may be very nicely regulated.

Although not necessarily limited thereto, my invention is particularly applicable to systems of motor control for electric elevators, hoists, and the like, and especially to such systems which employ a Leonard type of drive.

The present application is directed to improvements in the system of motor control for which I filed an application for patent, Serial No. 704,059, on April 3, 1924. In my said former application I have described and claimed broadly a system of motor control incorporating a series exciter in a Leonard drive, the exciter being itself excited in response to the load on the motor and being connected to regulate a component of the separate excitation of the generator within a predetermined range of motor load values so as to compensate throughout said range for the inherent tendency of the speed of the motor to droop under motoring load and the inherent tendency of the speed of the motor to rise when the motor acts as a generator to return energy to the source of supply.

As explained in my said prior application, when the manually operated controller, which is provided for varying the energization of the separately excited generator field winding, is manipulated rapidly, there is experienced an undesirable instability in the speed of the motor supplied with armature current by the generator. This instability is particularly objectionable during retardation of the speed of said motor, to a comparatively low speed when a compounding effect is had for the full speed full load condition such as to compensate for the inherent tendency of the motor speed to droop under load. This is especially so in an elevator drive because of the heavy transient currents which are set up and because of the unpleasant riding qualities of the elevator under the conditions stated. Thus, when the controller is manipulated rapidly to effect retardation to low speed, the motor may either stop for an instant, or reverse for an instant and then continue in the desired direction at the low speed called for by the controller position. In my said prior application I have disclosed novel means functioning in response to the rate of change of an operating condition for taking care of this instability.

In accordance with the present invention, I control the excitation of the said series exciter in response to the rate of change of the field flux of the generator so as to retard the decrease or the increase of the separate excitation of the generator in response to rapid manipulation of the controller which effects a variation of the current in the separately excited generator field winding. A tapering off effect in the variation of the generator excitation is had which is desirable.

Figure 2:
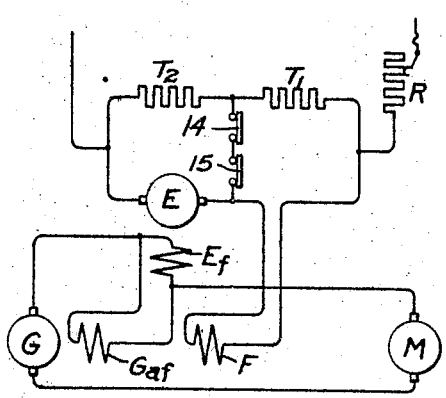
Figure 3:
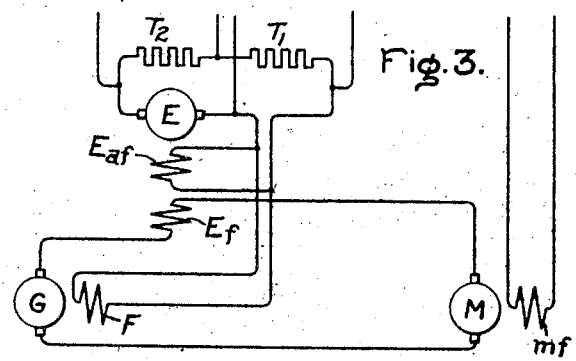

For a better understanding of the invention, reference is had to the accompanying drawing, which shows in Fig. 1 a very simple diagram illustrating an embodiment of the invention, and in Figs. 2 and 3 details illustrating modifications of the invention as shown in Fig. 1.

Referring to Fig. 1, a driving equipment is shown as of the Leonard type, including a motor M having a separately excited field $mf$ and a generator having an armature G and a separately excited field F. The motor is intended to be connected to drive a load, and while my invention is not necessarily limited thereto, it has a particular application in cases in which the motor is connected to drive an elevator, hoist or the like. The generator is intended to be driven in any suitable manner, preferably as is commonly the case, by an electric motor which receives energy from a source of supply, so that when the motor speed is retarded, a braking effect may be had by returning energy to the source of supply for the motor driving the generator. The connection of the motor M to its driven load and the connection of the motor which drives the generator G have not been shown, since those familiar with Leonard drives will readily understand the invention without such showing.

In order to control the speed of the motor, I control the energization of the separately excited field F of the generator, as is customary in Leonard drives. The excitation of the generator is preferably controlled as in my said prior application, in order to compensate for the inherent tendency of the speed of the motor M to vary under load. As disclosed in my prior application, this means takes the form of a series exciter having an armature E and an excitation field winding E$f$ which is included in the local circuit with which the armatures of the generator G and motor M are included. Thus, for ordinary conditions, the excitation of the exciter, and consequently its generated voltage will vary in dependence on the load of the motor M, this excitation varying in magnitude in accordance with the variations of the current in the local circuit in which the armatures of the generator and motor are included and also in accordance with the direction of that current.

As explained in my said prior application, this series exciter is intended to regulate a component of the separate excitation of the generator, and the exciter is preferably constructed so as to become saturated at substantially full load on the motor, thereby limiting the compensation effect of the exciter so that for motoring loads beyond the normal full load of the driving motor, the speed torque curve of the motor will droop in accordance with its inherent tendency, and also for generating loads of the motor M at values beyond the normal full load value, the speed of the motor will have a slight tendency to increase. The exciter is so constructed that it will have a full load voltage value, which is in the neighborhood of 35 to 40% of the voltage of the source 10 which supplies the separate excitation current for the motor and generator of the Leonard drive.

A manual control of the speed of the motor M is had through the operation of the master controller C which is indicated as of the reversing type and as of a combined master and resistor varying type. Thus, the movable element of the controller comprises a contact segment which is movable from the neutral or off position indicated toward the right to definite operative positions for one direction of motor operation and toward the left or counter-clockwise for motor operation in the opposite direction. The controller is effective to vary the resistor R which is included in the circuit with the field winding F of the generator, so as to vary the speed of the motor M. The controller is also effective to control the closing and opening of the directional contactors 12 and 13, the contactor 12 being provided for hoisting operation of the motor M, for example, and the contactor 13 being provided for lowering operation of the motor M. The resistor T is connected in multiple relation with the exciter armature E and the generator field winding F, connected in series relation with each other. The resistor R, resistor T and resistor armature E in generator field F, thus form a potentiometer connection whereby a nicety in the control of the excitation of the generator and consequently the speed of the motor M is had.

The contactors 12 and 13 have respectively the normally closed auxiliary switches 14 and 15 which establish a local circuit which includes a portion $T_2$ of the resistor T and the armature E of the series exciter. The purpose of this arrangement is to provide a local discharge path for the exciter armature so that when the controller C is returned to its neutral position after having been on one of the definite running positions, the exciter will have practically no effect in determining the excitation of the generator and consequently the speed of the motor M. The arrangement which I have described specifically is that which is disclosed in more detail and broadly claimed in my said prior application, Serial No. 704,059, filed April 3, 1924.

As explained in my said prior application, when the controller C is returned, for example, from the full speed running position to the first or low speed position, to effect retardation of the motor M and its connected load, an undesirable transient effect is experienced. Thus, when the motor M is connected to drive an elevator, the elevator car may be caused to come to rest and then proceed in the previous direction, but at the low speed as called for by the controller position. Under certain circumstances, the elevator car may be caused to temporarily reverse its direction of operation for an instant and then proceed in the desired direction at the desired low speed. This is occasioned by the necessity for providing such a degree of compounding supplied by the exciter E for the full load value speed of motor M, that the proportionate compounding effect at the low speed controller position is entirely too great. A further effect noted is that the acceleration of the motor does not proceed with the smoothness which is desired when the controller is manipulated rapidly so as to effect a quick increase in the speed of the motor M.

In accordance with my present invention, I compensate for this undesirable characteristic by providing a compensating effect to the exciter E in such a direction and of such a magnitude that a tapering off of the regulating effect of the exciter is had which prevents the occurrence of the undesirable conditions previously referred to. In carrying out the present invention, I provide an auxiliary field winding E$af$ for the exciter and energize this field winding by current induced in the auxiliary field winding G$af$ of the generator. A comparatively rapid increase or decrease in the current in the generator field winding F will cause a corresponding variation in the flux in the generator field structure. This will induce a current in the generator auxiliary field winding G$af$ which will be of a magnitude and in such a direction as to correspond to the magnitude and the direction of the change of the current in the field winding F. This induced current is utilized to vary the excitation of the exciter by causing the flux set up by the exciter auxiliary field winding E*af* to oppose or supplement temporarily the flux set up by the series field of the exciter E*f*. Thus, a rapidly rising field current in winding F will effect an energization of the exciter auxiliary field winding E*af* in a direction tending to cause the voltage generated by the exciter armature to oppose temporarily the increase in the current in the generator field winding F. Likewise, a rapidly reducing current in the generator field winding F will cause a current to be induced in the exciter auxiliary field winding E*af*, which will cause the exciter armature to generate a voltage of a value and in a direction to assist in temporarily maintaining the flow of current through the generator field winding F. It will thus be seen that the regulating effect is applied directly to the exciter without the interposition of auxiliary mechanism having an inherent time lag of operation, so that the response is sufficiently rapid to nicely meet the particular necessities of the case.

Those skilled in the art will understand that in order to cause the motor M to drive its load in a hoisting direction, the controller C is turned counterclockwise from the neutral position indicated in Fig. 1, and that in the first operative position the directional contactor 12 is closed, thereby connecting the generator field winding F to the source of supply 10, through a circuit which includes the resistor R, the main contacts of contactor 12, through the branches of the multiple circuit, one branch comprising the armature E of the exciter and the field winding F of the generator and the other branch including the resistor T, through the lower main contact of the contactor 12, to the lower conductor of the source 10. The auxiliary switch 14 associated with contactor 12 is opened, thereby opening the discharge circuit for the exciter armature. As the controller C is moved step by step, counterclockwise, sections of the resistor R are successively shunted so that finally when this resistor R is completely shunted, the full speed condition of the motor M is had. The compensating effect of the generator auxiliary field winding G*af* and the exciter field winding E*af* is for the purpose of compensating for the transient conditions occasioned by the rapid manipulation of the controller to either decrease or increase the speed of the motor M quickly. It will be understood that when the master controller C is rotated clockwise, in this case the directional switch 13 is closed instead of the directional switch 12, as was previously the case, and that the resistor R is shunted step by step, as previously explained. In this case the direction of operation of the motor M will be the opposite of that which was occasioned when the controller C was rotated counterclockwise.

In Fig. 2 I have indicated a detail showing the modification of the system of Fig. 1. It will be understood that this system is intended to have the controller C, and the contactors 12 and 13 and the connections of those parts, as in Fig. 1. Parts having similar functions are similarly designated. The essential difference between the system of Fig. 1 and Fig. 2 is that in Fig. 2 the auxiliary field winding G*af* of the generator is connected in shunt relation with the series field winding E*f* of the exciter. Thus, the transient currents induced in the generator auxiliary field winding are utilized to directly vary the current in the exciter series field winding, thus introducing a compensation effect of the same order and for the same purpose as was described in connection with the auxiliary field winding E*af* for the exciter in the system of Fig. 1.

Fig. 3 is likewise a detail of a modification of the system of Fig. 1, and like Fig. 2 parts having corresponding functions to similar parts of Fig. 1 are designated by the same reference charaters. The principal difference in the system of Fig. 3 and the system of Fig. 1 is that the generator G does not have an auxiliary field winding, but the auxiliary field winding E*af* of the exciter is connected in multiple relation with the separately excited field winding F of the generator. In the system of Fig. 3 the exciter auxiliary field winding is supplied with a current which varies in direction and value as the separate excitation of the generator varies. The flux set up by the auxiliary field winding E*af* of the exciter is used to either oppose or assist the flux set up by the series field winding E*f* of the exciter to produce the regulating effect referred to in connection with the description of the system of Fig. 1.

What I claim as new and desire to secure by Letters Patent of the United States is:—

1. In combination, a dynamo electric machine having a separately excited field winding, a controller for varying the energization of said winding to vary the armature voltage of said machine, a series exciter connected with said winding to regulate a component of the separate excitation of said machine, and voltage regulating means for said exciter connected with said machine to automatically respond to a rapid manipulation of said controller and arranged to effect a differential compounding of said exciter for limiting the rate of the variation of the voltage of said machine which is effected by such controller manipulation.

2. In combination in a Leonard drive, a controller connected to vary the energization of the separately excited generator field winding, a series exciter connected to regulate a component of the separate excitation of the generator, and voltage regulating means for said exciter connected to respond to the rate of change of the excitation of said generator and connected to effect a differential compounding of said exciter for limiting the rate of variation of the speed of the motor of said drive in response to a rapid manipulation of said controller.

3. In combination, a dynamo electric machine having a separately excited field winding, a controller for varying the energization of said winding, to vary the voltage of said machine, an exciter connected to vary the energization of said winding, the said exciter being provided with an exciting winding connected to be energized responsively to the armature current of said machine, and means energized responsively to the rate of change of the field flux of said machine arranged to effect a differential compounding of said exciter to thereby regulate the effect of the exciter in determining the armature voltage of said machine when said controller is rapidly manipulated.

4. In combination, a dynamo electric machine having a separately excited field winding, a controller for varying the energization of said winding, and an exciter having a series field winding connected to be energized in accordance with the armature current of said machine for regulating the energization of said winding, the said exciter being provided with an auxiliary field winding connected to be energized in accordance with the rate of variation of the energization of said first field winding for regulating the effect of said exciter in determining the generated voltage of said machine when said controller is rapidly manipulated to rapidly vary the generated voltage of said machine.

5. In combination, a dynamo electric machine having a separately excited field winding, a controller for varying the energization of said winding, and an exciter having a series field winding connected to be energized responsively to the armature current of said machine for regulating the energization of said winding to regulate the voltage of said machine, the said exciter being provided with an auxiliary exciting winding connected to respond to variations in the energization of said separately excited winding and acting differentially with respect to said exciter series field winding when said controller is rapidly manipulated to rapidly vary the voltage of said machine.

In witness whereof, I have hereunto set my hand this 15th day of August, 1927.

MAX A. WHITING.